United States Patent [19]

McKean

[11] Patent Number: 4,513,643

[45] Date of Patent: Apr. 30, 1985

[54] AUTOMATIC STUD DRIVING TOOL

[75] Inventor: John A. McKean, Fairview, Pa.

[73] Assignee: Titan Tool Company, Fairview, Pa.

[21] Appl. No.: 466,069

[22] Filed: Feb. 14, 1983

Related U.S. Application Data

[63] Continuation-in-part of Ser. No. 360,821, Mar. 24, 1982, Pat. No. 4,470,329, which is a continuation-in-part of Ser. No. 265,706, May 21, 1981, abandoned, and a continuation-in-part of Ser. No. 579,288, Feb. 14, 1984, , which is a continuation of Ser. No. 405,365, Aug. 5, 1982, abandoned, which is a continuation of Ser. No. 179,444, Aug. 19, 1980, abandoned.

[51] Int. Cl.³ .............................................. B25B 19/00
[52] U.S. Cl. .................................................... 81/53.2
[58] Field of Search ......................................... 81/53.2

[56] References Cited

U.S. PATENT DOCUMENTS

| 2,492,307 | 12/1949 | McKean | 81/53.2 |
| 2,516,288 | 7/1950 | Bagoon | 81/53.2 |
| 2,531,456 | 11/1950 | McKean | 81/53.2 |
| 2,743,639 | 5/1956 | Lynch | 81/53.2 |
| 3,793,912 | 2/1974 | Bilz | 81/53.2 |

FOREIGN PATENT DOCUMENTS 920402 3/1963 United Kingdom ................ 81/53.2

Primary Examiner—James L. Jones, Jr.
Attorney, Agent, or Firm—Parkhurst & Oliff

[57] ABSTRACT

An automatic stud driving tool is provided having a carriage, and a set of jaws disposed within the carriage. The jaws and carriage are provided with permanent contours that prevent the jaws from being withdrawn from the carriage when the jaws are open, but which do not prevent such withdrawal when the jaws are closed. The carriage and jaws are rotationally interlocked, and the carriage is capable of axial movement within a body element only when the jaws are closed, and axial movement of the carriage within the body results in the engagement and disengagement of a rotational drive from the carriage. Automatic operation of the tool can be enhanced through the use of a depth gauge.

17 Claims, 4 Drawing Figures

AUTOMATIC STUD DRIVING TOOL

CROSS-REFERENCE TO RELATED APPLICATIONS

This application is a continuation-in-part of application Ser. No. 360,821 filed Mar. 24, 1982, now U.S. Pat. No. 4,470,329, which is itself a continuation-in-part of application Ser. No. 265,706 filed May 21, 1981 now abandoned. This application is also a continuation-in-part of application Ser. No. 579,288 filed Feb. 14, 1984, which is a continuation of application Ser. No. 405,365 filed Aug. 5, 1982, now abandoned which is a continuation of application Ser. No. 179,444 filed Aug. 19, 1980 now abandoned.

BACKGROUND OF THE INVENTION

This invention relates to automatic stud drivers used, for example, in the automotive and furniture industries. These stud drivers are typically able to grasp a stud and thread it into a work piece, and are then capable of automatically releasing the stud without the requirement that the stud be unthreaded from the tool.

OBJECTS OF THE INVENTION

The principle objects of the present invention are to provide an automatic stud driver that can be easily and quickly assembled with a minimal number of tools, which is easier to manufacture than prior automatic stud setters, which has a smaller maximum outside diameter than prior automatic stud setters for use in work areas in which larger prior automatic setters could not be utilized, and which will be less prone to breakage in use.

DETAILED DESCRIPTION OF THE INVENTION

Figure 1:
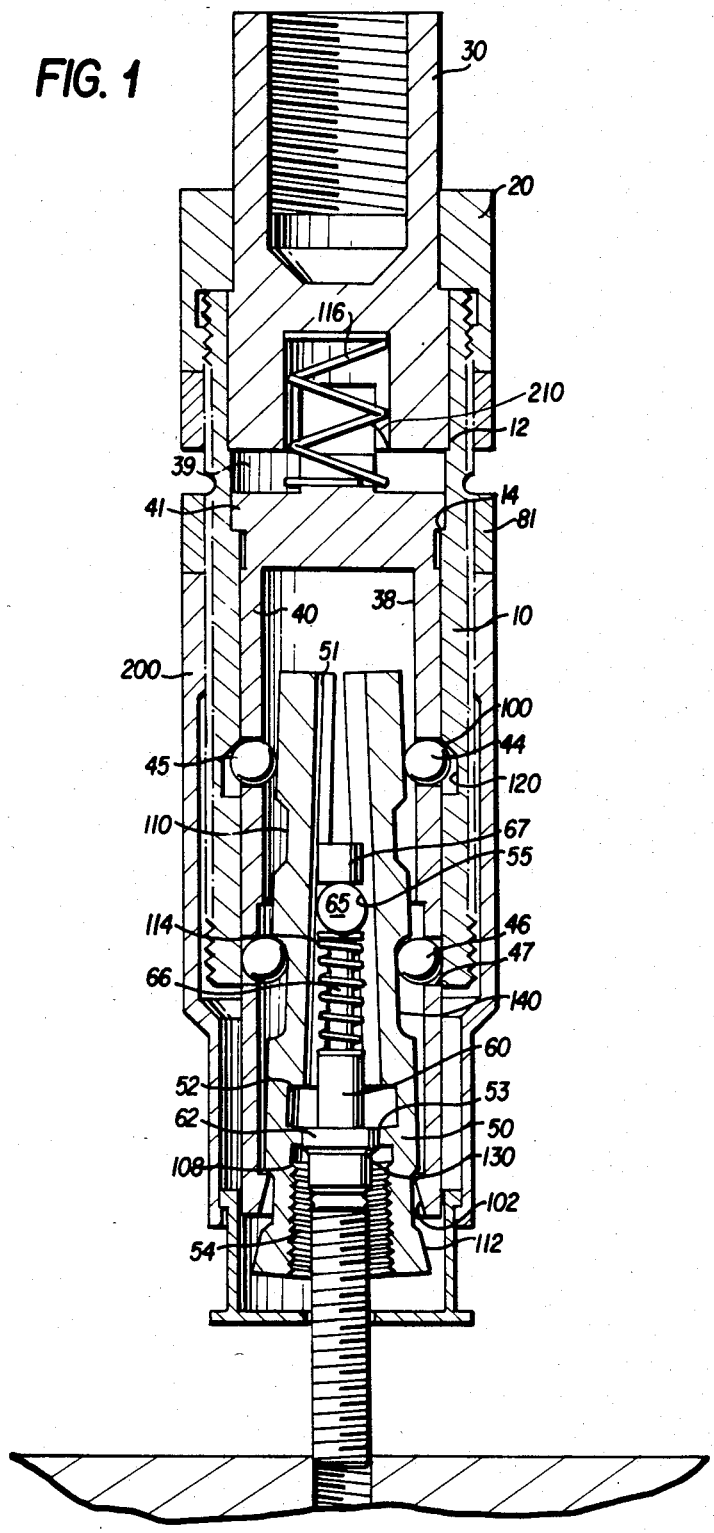
FIG. 1 is a cross-sectional view of the stud driver of the present invention at an initial point in the operating cycle.

The following is a detailed description of one embodiment of the present invention, and should be understood to limit the appended claims by way of example only.

The automatic stud driver according to the present invention is composed of a body 10; a collar 20; a driven head 30; carriage 40; two sets of balls in the carriage (two upper lock balls 44 and two lower lock balls 46); a set of jaws 50; a plunger 60; and a depth gage 200.

The body 10 is a cylindrical member, and may be provided with a uniform thread on the exterior surface thereof. The interior of the body comprises a cylindrical cavity of varying cross-sectional diameter. In the embodiment disclosed in the figures, the minimum diameter extends between the carriage ledge 14 and the bottom edge of the body. This minimum diameter is interrupted at an intermediate point by an annular enlargement 120 of the interior cavity of body 10, whose function will be more fully described below. The upper edge of annular enlargement 120 is provided with an angled camming surface 100.

The upper edge of the minimum diameter portion of the body cavity terminates at carriage ledge 14, where the diameter of the body cavity abruptly increases to a somewhat large circular cross-section. This somewhat larger cross-section similarly terminates abruptly at head ledge 12, where the body cavity is again enlarged to another circular cross-section.

Driven head 30 is disposed within the upper portion of the hollow body cavity, and has at its lower end an outside cylindrical circumference sufficient to provide a minor clearance between the upper portion of the body 10 and the lower portion of the driven head 30, but which is too large to move past head ledge 12. The driven head 30 is maintained within the upper end of the hollow body cavity by collar 20, which is threadably secured to the exterior surface of body 10. Driven head 30 is thus axially secured within the body cavity, but maintains the ability to rotate relative thereto.

Carriage 40 is of roughly cylindrical shape, the majority of the exterior circumference thereof being sized sufficient to allow sliding and rotational movement within the minimum diameter portion of the body cavity. The uppermost section of the carriage has an abrupt increase in cross-sectional diameter, thereby forming carriage head 41. The diameter of this carriage head is small enough to allow it to move past head ledge 12, but is too large to allow passage beyond carriage ledge 14. The axial length of carriage head 41 is substantially less than the axial length of the intermediate diameter of the body cavity, i.e. that portion between head ledge 12 and carriage ledge 14.

Carriage 40 is therefore constrained to a limited axial movement within the hollow body cavity, the upper extent of such movement being defined by the position in which carriage head 41 contacts the bottom of driven head 30, the bottom extent defined by the position in which carriage head 41 contacts carriage ledge 14. Since both the exterior of the carriage and the surface of the body cavity are cylindrical, carriage 40 is free to rotate within body 10.

The interior of carriage 40 is a roughly cylindrical cavity 38, which communicates to the exterior of the carriage at the bottom thereof. In the preferred embodiment, the resulting wall of the carriage is pierced by four apertures, two diametrically opposed upper carriage apertures 45, and two diametrically opposed lower carriage apertures 47. The axial position of the upper carriage apertures are such that they are aligned with the enlargement 120 when the carriage head is in contact with the carriage ledge 14, but are also such that the upper carriage apertures 45 will not be aligned with enlargement 120 when carriage head 41 is in contact with the bottom of driven head 30, as can be best seen in FIG. 3. The lower carriage apertures 47 are axially positioned along the carriage 40 such that they are always aligned with the minimum diameter portion of the body cavity.

The lowermost portion of the carriage 40 extends below the bottom of body 10, and terminates in a specially contoured aperture. This aperture is provided with a closing contour 102, best seen in FIG. 1, and a holding contour 104, best seen in FIG. 2, whose functions will be more fully described below.

The carriage 40 is the envelope for the assembly of jaws 50. Although these jaws are shown in cross-section in the accompanying drawing figures, it should be understood that each of jaws 50 is of a roughly semi-cylindrical shape similar to the jaws described in application Ser. No. 360,821, filed Mar. 24, 1982. On the inside planar surface of each jaw 50 is a semicircular cross-section groove 51 extending the length of the jaw. The lower section of the groove 51, the threaded section 54, is threaded to match the threads on a stud. Thus, when the jaws are closed onto the stud the threaded section 54 of the jaws 50 can grip the stud without damaging any of the threads on the stud.

Fitted into the upper section of the groove 51 above the threaded section 54 is the plunger means 60. The plunger means 60 is held in the groove 51 of the jaws by a pivot cylinder 65, which appears endwise in the figures. This pivot cylinder 65 is seated in a pair of pivot grooves 55, one groove on the interior surface of each jaw 50. The pivot grooves 55 extend laterally across the width of jaw 50, in a direction perpendicular to the longitudinal axis of the tool. Because the jaws 50 are constrained within the carriage 40 from moving apart enough to allow pivot cylinder 65 to slip out of the enclosure formed by facing pivot grooves 55, the pivot cylinder 65 is firmly retained within the spacing between jaws 50.

The pivot cylinder 65 is slidably mounted on the plunger means 60 by shaft 66. A stop 67 is secured to the end of shaft 66 which protrudes above pivot cylinder 65. This stop may be secured to shaft 66 in any known releasable manner, as for example by threading. Shaft 66 further extends through pivot cylinder 65 toward the bottom of the tool and terminates in annulus 62. Spring 114 biases annulus 62 away from pivot cylinder 65.

The interior groove 51 of each jaw has at its lower end, above threaded section 54, a semiannular closing groove 52. This closing groove 52 is sized sufficiently large so that the jaws may approach each other closely enough to allow threaded section 54 to mate with the threads of the stud, while maintaining a clearance between annulus 62 and closing groove 52.

Annulus 62 is provided at its bottom edge with an angled opening surface 108, the opening surface 108 being capable of bearing against opening edge 53 at the bottom of closing groove 52 through a biasing action of spring 114. When annulus 62 has moved past opening edge 53, it contacts blocking surface 130 of groove 51, which has a smaller semicircular diameter than does closing groove 52. This contact between annulus 62 and blocking surface 130 prevents the jaws 50 of the tool from moving toward each other until a stud is placed into the end of the tool to overcome the biasing force of spring 114, and move annulus 62 into alignment with closing groove 52.

The exterior surfaces of the bottom portion of jaws 50 are provided with specialized surfaces. These specialized surfaces comprise closing contour 112, best seen in FIG. 1, and holding contour 106, best seen in FIG. 2. When a stud is inserted between jaws 50 and contacts annulus 62 with sufficient force to move it into closing groove 52, jaws 50 are moved upward into the interior of carriage 40. At this point closing contour 112 contacts closing contour 102, and the resulting interaction between these inclined surfaces causes the bottoms of jaws 50 to be wedged together, so that threaded section 54 may firmly grasp the stud.

When the stud is pulled toward the bottom of the tool, jaws 50 are extended out of carriage 40 by the firm grip between threaded section 54 and the threads of the stud, until the closing contours 102, 112 no longer force the bottoms of jaws 50 together. The inclined surfaces of the threads of the stud now interact with the inclined surfaces of the thread portions of threaded section 54, to wedge the bottoms of jaws 50 apart. Opening edges 53 on the interior surfaces of each jaw 50 are thereby withdrawn far enough apart to allow annulus 62 to move past them under the urging of spring 114, and annulus 62 now contacts blocking surface 130. The diameter defined by the distance between holding contours 106 on each jaw is now larger than the diameter of the carriage interior at holding contour 104. Jaws 50 are therefore securely held within carriage 40, and cannot be removed until annulus 62 is forced from contact with blocking surface 130, i.e. upward into closing groove 52. At this configuration, the distance between closing contours 112 of each jaw 50 is larger than the smaller internal diameter of the carriage 40 at closing contour 102. Because the jaws 50 are held apart by the engagement of annulus 62 and blocking surface 130, the jaws 50 are thereby prevented from moving back into carriage 40.

It is advantageous that holding contours 104 and 106, and closing contours 102 and 112 be constructed as a permanent portion of the carriage 40 and jaws 50, to thereby increase the reliability, strength and durability of the tool. These qualities may be further enhanced by forming each element and its respective contours from a single piece of material.

Inner locking groove 140 is provided in the exterior surface of each jaw 50. These inner locking grooves 140 are situated such that when the set of jaws 50 are assembled about plunger 60, they extend longitudinally along a portion of jaws 50, and are placed along the axial length of jaws 50 at a position sufficient to allow the grooves to be aligned with lower carriage apertures 47 both when holding contour 104 is engaged with holding contour 106, and when closing contour 102 is engaged with closing contour 112.

Lower lock balls 46 are disposed within lower carriage apertures 47, and are of a diameter sufficiently large so that they not only protrude into lower carriage apertures 47, but also protrude into inner locking grooves 140. Because these grooves 140 are substantially no wider than the diameter of lower lock balls 46, the assembly of jaws 50 is thereby rotationally interlocked with carriage 40. That is, any rotation applied to carriage 40 is transmitted by lower lock balls 46 to inner locking groove 140 of the jaw assembly. When the jaws assume their closed position, the bottom of the grooves are substantially parallel to the axis of the tool.

Cross-section reduction 110 is located on the exterior surface of jaws 50 above inner locking groove 140. This cross-section reduction 110 can take the form of either longitudinally extending grooves similar in shape to those of inner locking grooves 140, or can take the form of a reduced diameter cross-section of the exterior of jaws 50. If the latter alternative is chosen, upper lock balls 44 will be unable to transmit torque applied to carriage 40 to jaws 50, but since this function is already performed by lower lock balls 46, the provision of a groove at cross-section reduction 110 is not strictly necessary.

Cross-section reduction 110 is positioned longitudinally on jaws 50 so that it is not aligned with upper carriage apertures 45 when holding contours 104 and 106 are fully engaged, but such that it comes into alignment with upper carriage apertures 45 when closing contour 102 has mated sufficiently with closing contour 112 to allow the stud to be grasped.

Upper lock balls 44 are disposed within upper carriage apertures 45, and have a diameter larger than the thickness of the carriage wall. Because of this larger dimension, a portion of the upper lock balls 44 must be accommodated by a space other than that provided by upper carriage apertures 45. When the jaws 50 are open, i.e. when holding contours 104 and 106 are fully engaged, cross-section reduction 110 is not aligned with the upper carriage apertures 45, and the larger dimension of the lock balls 44 must by necessity be accommodated within enlargement 120 of the body cavity. Once closing contours 102 and 112 have been engaged and the stud has been firmly gripped, the jaws 50 have moved into the position shown in FIG. 2, and cross-section reduction 110 is now aligned with upper carriage apertures 45. This extra space allows camming surface 100 at the upper edge of enlargement 120 to cam upper lock balls 44 inward into cross-section reduction 110 and entirely out of enlargement 120. Further downward force applied to the tool then results in the carriage moving upward within the body cavity, until carriage head 41 contacts the lower surface of driven head 30.

The upper surface of carriage head 41 and the lower surface of driven head 30 are provided with mating contours sufficient to allow a torsional interconnection between driven head 30 and carriage 40 when carriage head 41 contacts driven head 30. A specific example of contours sufficient for this purpose have been shown, in FIGS. 2 and 3. As can be clearly seen, carriage head 41 is provided with an upstanding post 141 running across its diameter. The post 141 can have a square cross-section, best seen in FIGS. 2 and 3. This upstanding post 141 is designed to mate with a corresponding slot 134 provided in the bottom surface of head 30. When post 141 engages slot 134, head 30 and carriage 40 are rotationally interlocked, so that a torque applied to head 30 can be transmitted to carriage 40.

The bottom surface of driven head 30 is preferably not flat, but is instead provided with two chamfers 210, that are symmetrically arranged with respect to the axis of the tool. Each of these chamfers 210 can take the form of an inclined surface, best shown in FIG. 4, which inclines from the bottommost portion of the driven head upward, away from carriage 40 and post 141, and continues to extend in this direction until it terminates at the radially outermost edge of slot 134. The chamber 210 is shown on edge in FIGS. 2 and 3. The direction of the incline of chamfer 210 is chosen such that when the driven head is given an operational rotational input and the carriage has not yet moved axially toward the driven head nor begun to rotate, the distance between the top of post 141 and the directly opposite portion of the bottom of driven head becomes progressively larger as the chamfer 210 passes over post 141. That is, the chamfers 210 provide surfaces which are inclined axially upward to form a ramp leading toward the slot 134.

In operation, when the as yet non-rotating carriage head 41 and the post 141 advance toward driven head 30, the tip of post 141 contacts chamfer 210 and is allowed to smoothly advance upward along the ramp defined by the chamfer 210 to a point somewhat beyond the lowermost edge of the advancing slot 134. Post 141 is therefore advanced toward slot 134 to a point beyond that which would be allowed without chamfer 210, and as a result high speed engagement between slot 134 and post 141 is facilitated. That is, the post 141 is guided along the ramp defined by the chamfers 210 toward the slot 134, rather than abruptly engaging the slot upon alignment of the post 141 with the slot 134 if the slot were provided in a flat bottom surface of a driven head 30. Further, the square cross-section of post 141, in combination with chamfer 210, allows a more abrupt disengagement between slot 134 and post 141 upon withdrawal of the carriage. This decreases the tendency of the tool to impart axial impacts to both driven head 30 and carriage 40 when post 141 and slot 134 are disengaged, but are still in close enough proximity to interfere with each other as they pass during each rotation.

The height of post 141 is less than the distance that carriage 40 is capable of sliding axially within the body cavity. This results in carriage 40 and head 30 being rotationally disengaged when carriage head 41 is engaged with carriage ledge 14. Drive disengaging spring 116 is disposed between head 30 and carriage 40, thereby biasing these members into the rotationally disengaged position.

The height of post 141 and the axial spacing between driven head 30 and carriage head 41 are such that post 141 disengages from slot 134 when carriage head 41 is still a significant distance above carriage ledge 14. This results in upper carriage apertures 45 being nonaligned with enlargement 120 when the rotational drive supplied to carriage 40 by driven head 30 is first disengaged. At this point, due to the nonalignment between upper carriage apertures 45 and enlargement 120, jaws 50 remain in their closed position, firmly grasping the stud. The tool thus is prevented from driving the jaws 50 about the stud unless they are in the closed position.

Figure 2:
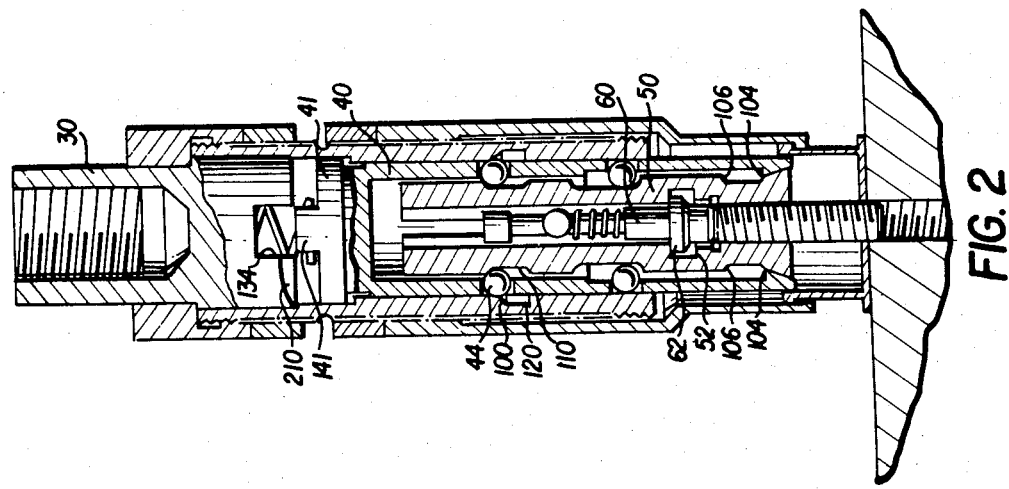
FIG. 2 is a cross-sectional view of the stud driver at an intermediate point in the operational cycle, and also includes a different view of the rotational drive engaging means.

Depth gauge 200 is provided on the exterior of body 10. This depth gauge 200 can advantageously take the form of a hollow cylinder that has at least a portion of the interior surface thereof provided with threads capable of engaging the threads on the exterior of body 10. The bottom of depth gauge 200 extends below the fully extended edge of carriage 40, as shown in FIGS. 1 and 2. The extent to which depth gauge 200 exceeds the bottom of carriage 40 can be adjusted by threading the depth gauge 200 along the exterior of body 10 to the desired placement, and then locking the depth gauge in place through the threaded lower collar 81. The function of the depth gauge will be most clearly explained through the following description of the stud driving sequence.

FIG. 1 describes the tool in the position it assumes immediately prior to being loaded onto an undriven stud. Jaws 50 are open, and holding contours 104 and 106 are fully engaged, thereby preventing the removal of jaws 50 from carriage 40. Upper lock balls 44 are contained within enlargement 120, thereby preventing the carriage from moving axially with respect to the body. Carriage head 41 is in contact with carriage ledge 14, and post 141 is therefore disengaged with slot 134. As the tool and stud approach each other, the stud contacts plunger 60, moving annulus 62 away from blocking surface 130 and into closing groove 52. Further movement between the tool and the stud thereby causes closing contours 102 and 112 to act upon each other and close jaws 50 firmly about the stud.

In the position shown in FIG. 2, the cross-section reduction 110 has come into alignment with the upper carriage apertures and has allowed camming surface 100 to push upper lock balls 44 into cross-section reduction 110, and out of enlargement 120. The carriage is now free to move axially with respect to the body, and is beginning to approach driven head 30, although post 141 and slot 132 have not yet engaged.

Figure 3:
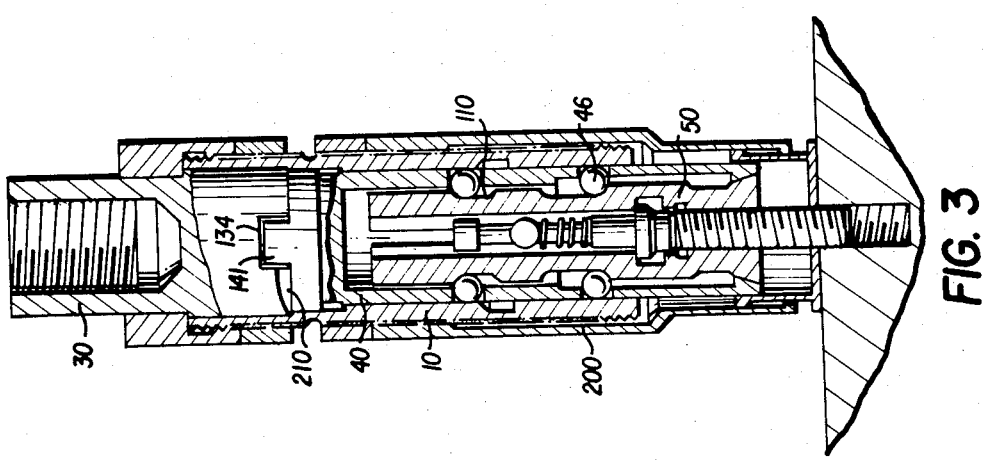
FIG. 3 is a cross-sectional view of the stud driver at a further instant in the operational cycle.

In FIG. 3, the tool continues to advance toward the stud. When post 141 engages slot 134, the rotation supplied to driven head 30 drives the carriage, lower lock balls 46, and jaws 50, thereby imparting rotational motion to the stud. At the particular instant illustrated in FIG. 3, the stud is beginning to thread into the work piece, and depth gauge 200 is approaching firm contact with the work piece.

Figure 4:
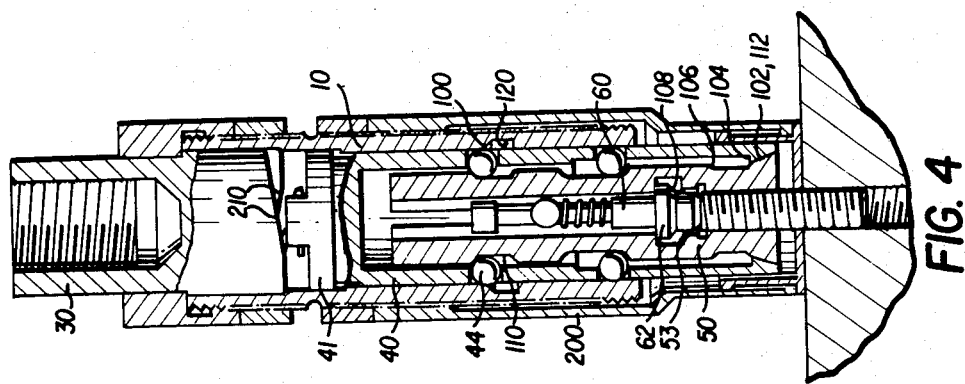
FIG. 4 is a cross-sectional view of the stud driver at yet another stage in the operational cycle.

In FIG. 4, depth gauge 200 has firmly contacted the work piece. Since depth gauge 200 is rigidly interconnected with body 10, body 10 is prevented from advancing further toward the work piece. However, since post 141 and slot 134 continue to be engaged, the stud is further threaded into the work piece and serves to draw the carriage downward away from head 30. At the instant shown in FIG. 4, carriage 40 has moved sufficiently away from the head 30 to disengage post 141 and slot 134, the rotational motion imparted to the stud has ceased, and the implantation of the stud is completed.

To remove the tool it is simply necessary to pull the tool upwardly away from the stud and work piece. This serves to pull the jaws 50 in a direction away from carriage 40, thereby disengaging closing contours 102 and 112. When these contours have become sufficiently disengaged and the jaws 50 have been opened by the interaction between the threaded portions of the jaws 50 and the stud, spring 114 forces annulus 62 to engage blocking surface 130. Holding contours 104 and 106 are now fully engaged and again prevent the removal of the jaws 50 from the tool.

The relative movement between the jaws and carriage has caused upper carriage apertures 45 to become aligned with enlargement 120, and has allowed the upper edge of cross-section reduction 110 to force upper lock balls 44 into enlargement 120. The stud has therefore been automatically disengaged from the tool, and the tool is ready for another cycle.

To disassemble the automatic stud driving tool of the present invention, the tool is first brought into the configuration shown in FIG. 1, i.e. with jaws 50 in their open position. Collar 20 may be removed by unthreading it from body 10, thereby freeing driven head 30 and drive disengaging spring 116 to be withdrawn out of body 10 as well.

Because jaws 50 are in their open position and upper lock balls are forced into enlargement 120, the carriage 40 cannot be initially withdrawn from the interior of the body 10. Instead, a stud must be inserted between the jaws 50 so as to engage plunger 60 and cause the jaws to assume their closed position as described above.

Upper lock balls 40 may then be moved by camming surface 100 into the cross-section reduction 110, and the carriage 40 may be withdrawn from within body 10. The upper and lower lock balls 44, 46 may now be removed from the now exposed upper and lower carriage apertures 45 and 47.

To remove the assembly of jaws 50 from within the carriage 40, it is necessary to maintain the jaws 50 in their closed position while they are being extracted, so as to avoid holding contour 104 from contacting holding contour 106 and thereby preventing removal of jaws 50.

Assembly is the reverse of the removal procedure.

I claim:

1. An automatic stud driving tool comprising:
a hollow body,
a carriage disposed within said body and having a longitudinal axis, the carriage provided with a cavity extending therethrough along said axis;
a pair of opposed jaws provided partially within said cavity and capable of sliding simultaneously as a unit along the axis of said carriage, the jaws being substantially non-rotatable with respect to said carriage, means for assuring that the jaws are capable of moving with respect to said carriage to at least two positions relative to each other, an open and a closed position;
the pair of jaws being provided with gripping means for gripping a stud in a non-rotatable manner when said jaws are in said closed position, and for releasing said stud when said jaws are in said open position;
preventing means for positively preventing the jaws from moving from the open position to the closed position unless a stud is engaged with said gripping means;
holding means provided to prevent the removal of the jaws from the carriage when said jaws are in said open position, said holding means comprising a permanent holding contour on the surface said jaws, and a permanent holding contour of the surface of said cavity, such that when the jaws assume their open position the permanent holding contours abut and prevent removal of said jaws, but when said jaws assume their closed postion the permanent holding contours do not abut and the jaws can be removed from said carriage, such that said jaws are held within said carriage at the open position substantially only by said permanent contours;
wherein the carriage is axially movable with respect to said body; and
means are provided to rotate the carriage to thereby rotate the jaws, to in turn rotate the stud into a work piece.

2. An automatic stud driving tool as in claim 1, wherein the axial movement of the carriage with respect to the body serves to engage and disengage the rotational input means from the carriage, and wherein means are provided to positively prevent the carriage from moving relative to the body when the jaws are in said open position.

3. An automatic stud driving tool as in claim 2, wherein the carriage preventing means comprises at least one upper lock ball, an enlargement in the inner surface of the body, an upper aperture through the wall of the carriage and a portion of the jaws having a reduced cross-section, wherein each upper lock ball has a diameter larger than the thickness of the wall of the carriage, and is carried in the upper aperture in the carriage wall, such that when the jaws are in their open positon, the enlargement in the body and the upper aperture are aligned, but the reduced cross-section of the jaws is not aligned therewith, thereby causing the upper lock ball to protrude into the enlargement and preventing the relative movement of the carriage and body.

4. An automatic stud driving tool as in claim 3, wherein when the jaws are in their closed position, the reduction in cross-section is aligned with each upper aperture in the carriage wall, so that each upper lock ball can move out of the enlargement and thereby free the carriage to move axially with respect to the body.

5. An automatic stud driving tool as in claim 2, further including a depth gauge comprising an extension of said body beyond the gripping means of said jaws, such that when the stud is threaded into a work piece to a predetermined depth the depth gauge contacts the work piece and prevents the body from moving closer thereto, whereupon further rotation of the stud results in the carriage being withdrawn away from the body, thereby causing the disengagement of the carriage from the rotational input means.

6. An automatic stud driving tool as in claim 5, wherein the depth gauge is adjustable.

7. An automatic stud driving tool as in claim 4, wherein the mechanism for preventing the relative rotation of the jaws and the carriage comprises at least one lower lock ball, a lower aperture in the wall of the carriage for each lower ball, and a longitudinal groove in one of said jaws for each lower ball, such that the lower balls each are partially contained in their respective lower apertures and extend into the grooves of the jaws at all positions of the jaws with respect to the carriage, to thereby prevent the jaws from being removed from the carriage when the jaws are closed.

8. An automatic stud driving tool as in claim 1, wherein the jaw preventing means comprises an axial bore between said jaws, an annular groove in said bore, and a plunger having a head, the plunger disposed within the axial bore, the plunger head and annular groove being sized such that there is a clearance between said head and said annular groove when said head is substantially inside said groove, but wherein the head abuts against the axial bore to retain the jaws in the open configuration until a stud moves the plunger head into the annular groove.

9. An automatic stud driving tool as in claim 8, wherein the means for assuring that the jaws are capable of assuming the closed position comprises a permanent closing contour on the surface of each jaw, and a permanent closing contour on the surface of the cavity, such that when the jaws move toward the cavity the closing contours bear against each other and force the jaws into the closed position.

10. An automatic stud driving tool as in claim 1, wherein the gripping means are provided at the axial end of the jaws furthest away from said carriage, and wherein the permanent holding contours of the jaws are located at the same axial level as the gripping means.

11. An automatic stud driving tool as in claim 4, wherein biasing means are provided to bias the carriage into the position where the upper aperture is aligned with the enlargement, to thereby favor the movement of the jaws within the carriage over the movement of the carriage within the body.

12. An automatic stud driving tool as in claim 7, wherein the means for assuring that the jaws can attain the closed position comprises closing contours on the jaws and carriage cavity, and the only direct contact between the carriage and the jaws is through the upper and lower balls, the holding contours and the closing contours.

13. An automatic stud driving tool as in claim 1, wherein the mechanism for preventing the relative rotation of the jaws and the carriage comprises at least one lower lock ball, a lower aperture in the wall of the carriage for each lower ball, and a longitudinal groove in one of said jaws for each lower ball, such that the lower balls each are partially contained in their respective lower apertures and extend into the grooves of the jaws at all positions of the jaws with respect to the carriage, to thereby prevent the jaws from being removed from the carriage when the jaws are closed.

14. An automatic stud driving tool as in claim 2, wherein means are provided, as the stud is rotated into the workpiece, to disengage the rotational input before the jaws can assume the open position.

15. An automatic stud driver comprising:
a hollow body having an axis and defining an inner surface thereof;
a carriage having a cavity therein disposed within said hollow body and capable of axial movement relative to the body;
a plurality of jaws disposed at least partially within said cavity and being axially movable relative to said carriage, the jaws being able to assume an open and a closed position;
a rotational input for application to a head axially secured to said body, said head being engageable with the carriage when said carriage is at an upper position with respect to the body, but being disengaged from the carriage when the carriage is at a lower position;
carriage preventing means for preventing the carriage from moving from the lower position to the upper position when the jaws are in the open position, but allowing such movement of the carriage when the jaws are in the closed position, the carriage prevention means comprising an upper lock ball having a diameter greater than the thickness of the carriage wall, an upper aperture through the wall of the carriage partially containing the upper lock ball, an enlargement of the inner surface of body, and a reduced cross-sectional area of the jaws, such that when the carriage is at the lower position, the enlargement is aligned with the upper aperture, and when the jaws are open the reduced cross-sectional area is not aligned with the aperture, so that the upper lock ball must extend into the enlargement and thereby prevent axial movement of the carriage with respect to the body, but where, when the jaws are closed, the reduced cross-sectional area is aligned with the upper aperture to allow the upper lock ball to move out of the enlargement and thereby free the carriage to move with respect to the body;
resilient biasing means for biasing the carriage toward the lower position, to thereby favor movement of the jaws with respect to the carriage over movement of the carriage with respect to the body; and
means for preventing driving of the jaws about the stud unless the jaws are in the closed position, said means for preventing driving of the jaws including an upstanding post on one of the group of the carriage and the head and a mating slot in the other of the group of the carriage and the head, the height of the post being less than an axial distance between the upper and lower positions of the carriage such that the post engages the slot after the upper lock balls disengage from the enlargement.

16. An automatic stud driving tool as in claim 15, wherein the biasing means comprises a spring extending between the driven head and the carriage.

17. An automatic stud driving tool as in claim 15, wherein both the slot and post extend diametrically across the carriage and driven head, the post has a squared cross-section, and wherein the face of the element having the slot therein is chamfered, such that the distance between the face of the element and the post increases as the driven head is driven rotationally with respect to the carriage.

* * * * *